United States Patent
Arai

(10) Patent No.: US 6,739,859 B2
(45) Date of Patent: May 25, 2004

(54) ELECTRIC CIRCUIT APPARATUS OF INJECTION MOLDING MACHINE

(75) Inventor: Shuichi Arai, Nagano (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 91 days.

(21) Appl. No.: 10/105,324

(22) Filed: Mar. 26, 2002

(65) Prior Publication Data

US 2002/0142061 A1 Oct. 3, 2002

(30) Foreign Application Priority Data

Mar. 28, 2001 (JP) .......................... 2001-092357

(51) Int. Cl.$^7$ .............................................. B29C 45/78
(52) U.S. Cl. ........................................ 425/145; 425/162
(58) Field of Search ................................... 425/162, 145

(56) References Cited

U.S. PATENT DOCUMENTS 5,198,240 A * 3/1993 Baxi ........................ 425/145

FOREIGN PATENT DOCUMENTS

JP          7-272781 A      10/1995

* cited by examiner

Primary Examiner—Tim Heitbrink
(74) Attorney, Agent, or Firm—Birch, Stewart Kolasch & Birch, LLP

(57) ABSTRACT

An electric circuit apparatus of an injection molding machine includes a connector board which comprises a plurality of connection terminals to which connection wires can be connected, and a plurality of wiring lines each divided into two line segments in order to enable an additional circuit element to be connected to an existing circuit element provided as a standard element. The line segments of each wiring line are electrically connected to a pair of connection terminals. A connection element for short-circuiting or an additional circuit element is selectively connected to the pair of connection terminals.

10 Claims, 5 Drawing Sheets

US 6,739,859 B2

ELECTRIC CIRCUIT APPARATUS OF INJECTION MOLDING MACHINE

BACKGROUND OF THE INVENTION

1. Field of the Invention

The present invention relates to an electric circuit apparatus of an injection molding machine which consists of a plurality of circuit elements connected to one another.

2. Description of the Related Art

In general, an injection molding machine includes a plurality of electrical circuit elements, such as various sensors, switches including relays, and circuit boards. Such circuit elements are connected to one another by use of connection wires (connection cables) to thereby constitute an electric circuit apparatus.

Conventionally, such an electric circuit apparatus is configured to include standard circuit elements at the time of shipment from a plant. However, in order to cope with demands of users, the electric circuit apparatus is configured to enable the user to change the standard circuit by means of connecting an additional circuit element later. Specifically, in the vicinity of each circuit element, a junction terminal (e.g., a junction terminal disclosed in Japanese Patent Application Laid-Open (kokai) No. 7(1995)-272781) is disposed. A circuit (line) of an additional circuit element is not connected directly to an existing circuit element, but is connected to the existing circuit element via the junction terminal. Therefore, when an additional circuit element is to be connected to an existing circuit element, a connection wire connected to the junction terminal is first removed, and then the additional circuit element is connected to the existing circuit element by use of the junction terminal.

However, such a conventional electric circuit apparatus has the following drawbacks.

First, since a plurality of junction terminals are disposed at dispersed locations corresponding to respective circuit elements, a large installation space is required. In addition, when an additional circuit element is to be connected, the location of a corresponding junction terminal must be confirmed with reference to an instruction manual, which is cumbersome. Further, depending on the location of the junction terminal, the connection work is difficult to perform, and misconnection is likely to occur.

Second, since connection wires are typically connected to the junction terminal by use of screws, the connection work requires much labor and a long time. In addition, when screw-fastening or connection work is not performed properly, connection wires may come off due to vibration or the like. Therefore, the conventional scheme is not satisfactory from the viewpoint of reliability.

SUMMARY OF THE INVENTION

An object of the present invention is to provide an electric circuit apparatus of an injection molding machine in which wiring lines, each divided into two line segments for connection of an additional circuit element, are provided in a centralized manner in order to reduce the overall installation space.

Another object of the present invention is to provide an electric circuit apparatus of an injection molding machine which facilitates connection work and shortens the time required for the connection work.

Still another object of the present invention is to provide an electric circuit apparatus of an injection molding machine which enhances certainty and reliability of additional connections which are formed on a user side.

In order to achieve the above-described objects, the present invention provides an electric circuit apparatus of an injection molding machine, the electric circuit apparatus consisting of a plurality of mutually connected circuit elements and including a connector board which comprises a plurality of connection terminals to which connection wires can be connected, and a plurality of wiring lines each divided into two line segments in order to enable an additional circuit element to be connected to an existing circuit element provided as a standard element. The line segments of each wiring line are electrically connected to a pair of connection terminals. A connection element for short-circuiting or an additional circuit element is selectively connected to the pair of connection terminals.

DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, an electric circuit apparatus 1 of an injection molding machine M according to the present embodiment will be described in detail with reference to FIGS. 1 to 7.

Figure 1:
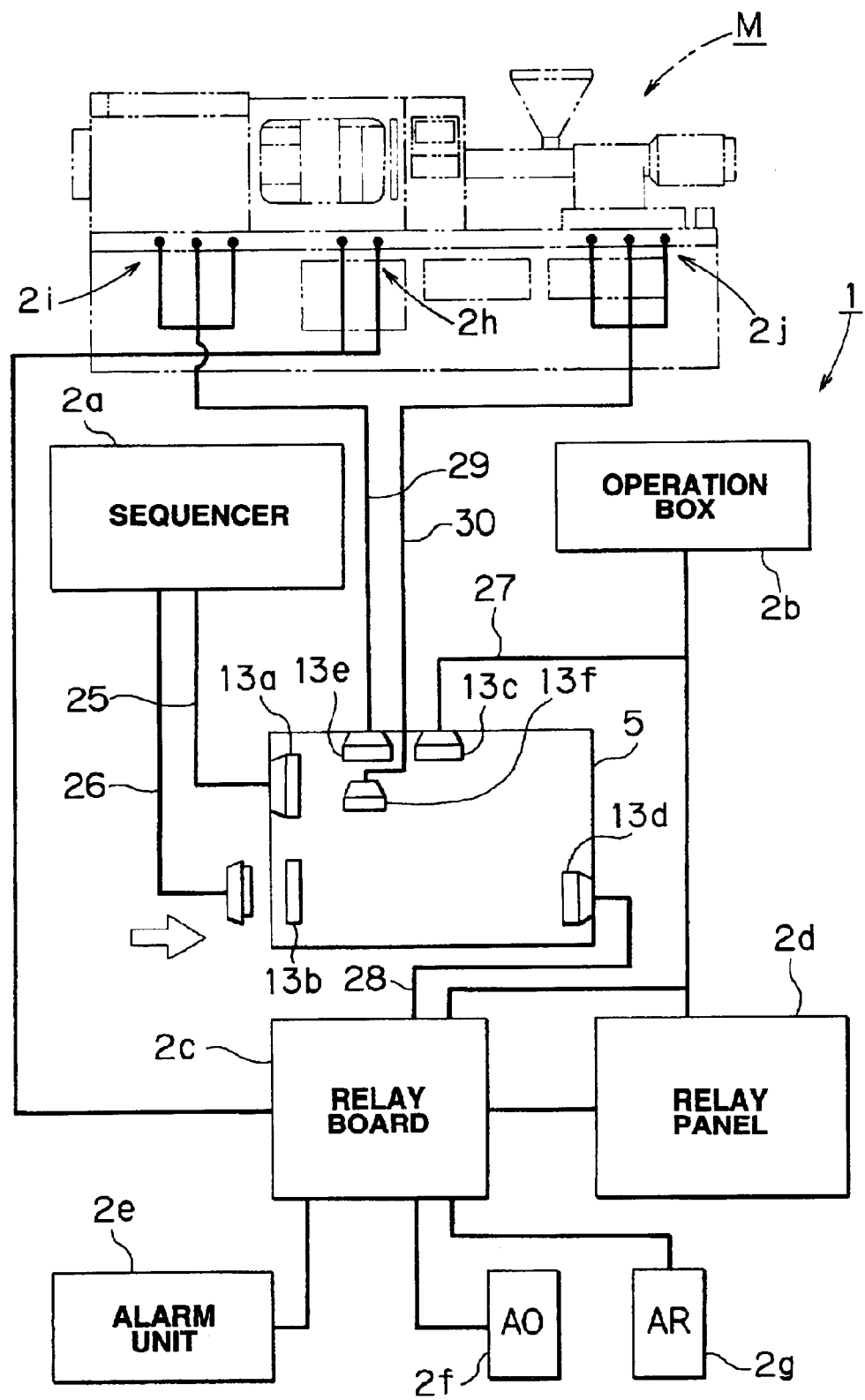
FIG. 1 is a block diagram of an electric circuit apparatus according to an embodiment of the present invention.

FIG. 1 shows the electric circuit apparatus 1, which is mounted on the injection molding machine M depicted by use of an imaginary line. The electric circuit apparatus 1 includes a plurality of circuit elements (2a, 2b, etc.), which are connected to one another. The circuit elements include a sequencer (main-axis board) 2a, an operation box 2b, a relay board 2c, a relay panel 2d, an alarm unit 2e, an automatic oil supply unit 2f, an automatic grease supply unit 2g, a group of safety-door limit switches 2h, a group of mold-clamp-unit proximity switches 2i, and a group of injection-unit proximity switches 2j. The illustrated circuit elements 2a, etc. are mere examples, and the electric circuit apparatus may include various other types of circuit elements. Notably, in the present specification, the term "circuit element" encompasses not only circuit boards and units, each being an aggregate of components, but also individual functional circuits and individual components mounted on the circuit boards.

Figure 2:
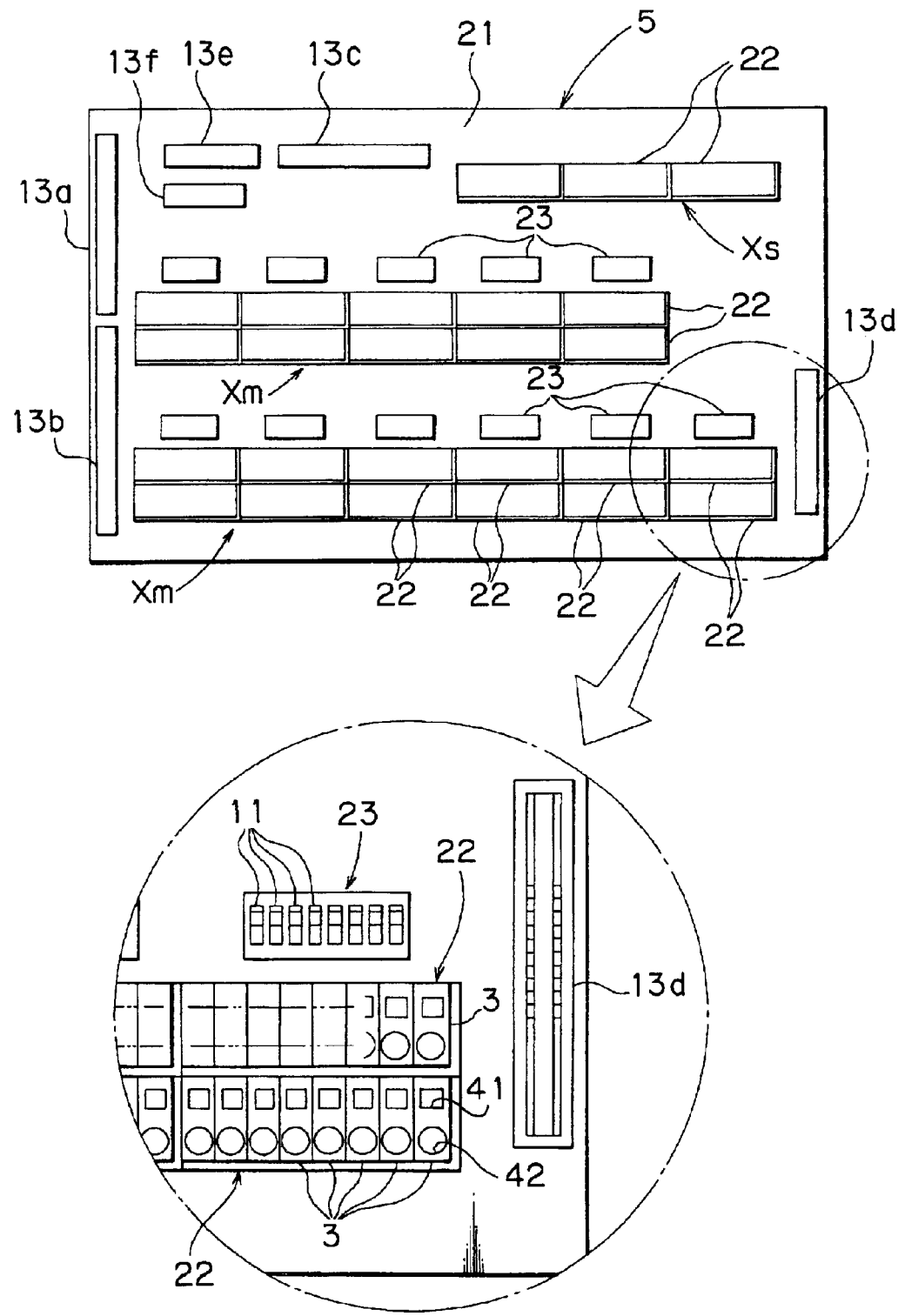
FIG. 2 is a plan view of a connector board provided in the electric circuit apparatus, including a partially-extracted enlarged view of the connector board.

The electric circuit apparatus 1 includes a connector board 5, which is the feature of the present invention. As shown in FIG. 2, the connector board 5 includes a printed wiring board 21. A large number of wiring lines each divided into two line segments 4m and 4n (see FIGS. 5 and 7) are provided on the printed wiring board 21 in the form of a wiring pattern, in order to enable connection of additional circuit elements 2ra, 2rb, 2rc (see FIGS. 6 and 7), which will be described later.

Figure 5:
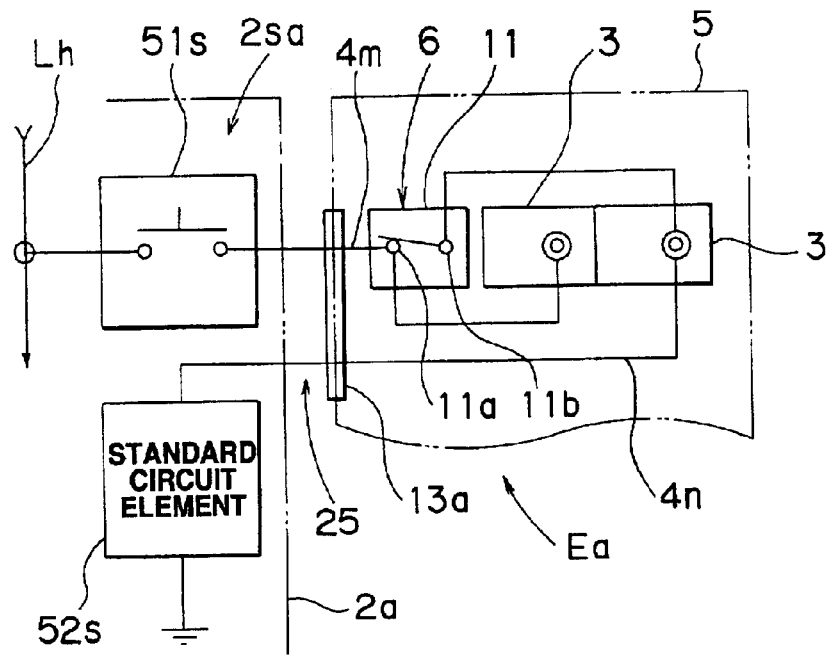
FIG. 5 is a circuit diagram showing a main circuit (a circuit for later addition) of the electric circuit apparatus which is configured as a standard circuit element.

Further, a plurality (25 in the present embodiment) of connection units 22 are amounted on the printed wiring board 21 in an aligned manner. In each of basic rows Xm, pairs of connection units 22 are arranged along a lateral direction in FIG. 2 in such a manner that two connection units 22 in each pair are arranged in a direction perpendicular to the lateral direction. In an auxiliary row Xs, connection units 22 are arranged, in a single line, along the lateral direction without forming pairs. As shown in the partially-extracted enlarged view of FIG. 2, each of the connection units 22 in the basic rows Xm includes eight connection terminals 3 arranged along the lateral direction. As shown in FIG. 5, the connection leads of the connection terminals 3 and the line segments 4m and 4n of the wiring lines are connected to each other by means of soldering or any other suitable means in such a manner that a certain connection terminal 3 of one connection unit 22 in a pair has electrical continuity with one line segment 4m of a corresponding wiring line, and a connection terminal 3 of the other connection unit 22 in the pair adjacent to the certain connection terminal 3 has electrical continuity with the other line segment 4n of the corresponding wiring line. Notably, the connection terminals 3 in the auxiliary row Xs are all connected to a ground line to be used as a common terminal.

Figure 3:
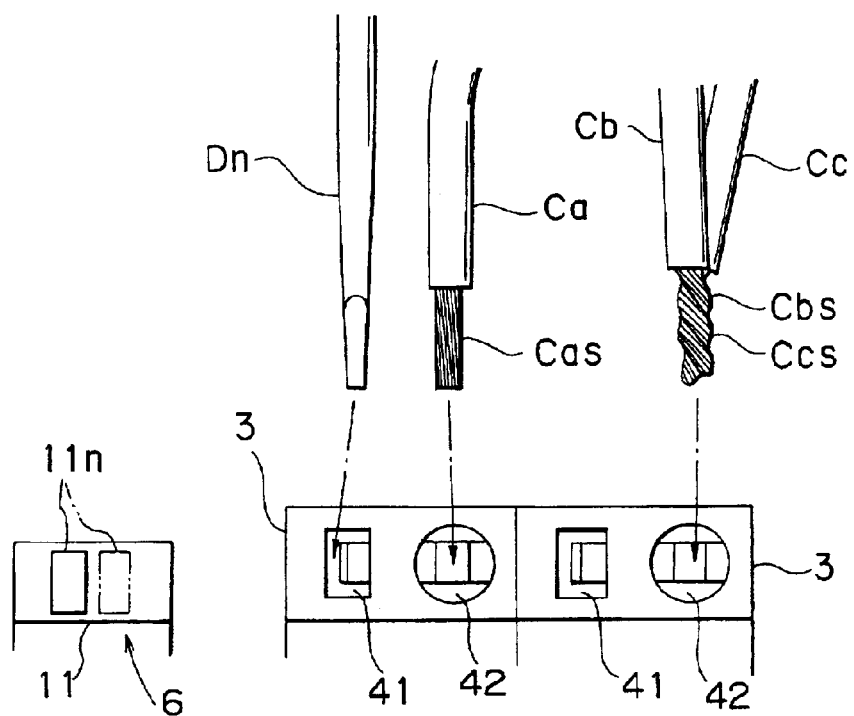
FIG. 3 is a plan view of connection terminals and an open/close switch mounted on the connector board.
Figure 4:
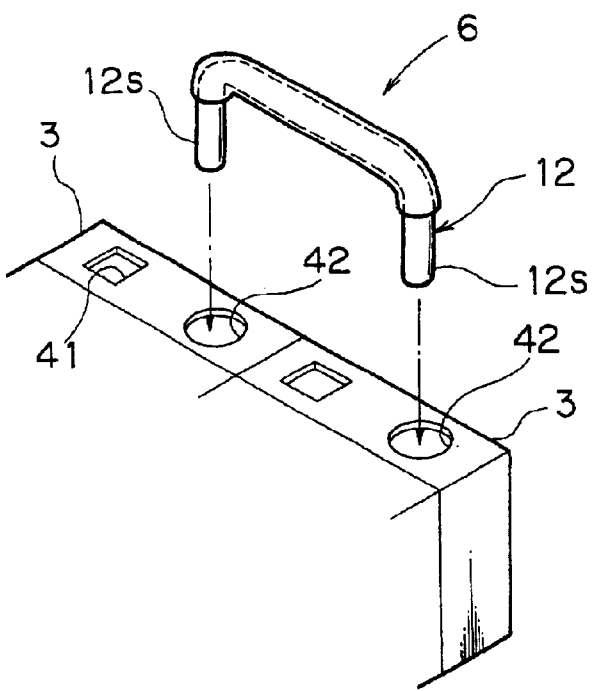
FIG. 4 is a perspective view of the connection terminals mounted on the connector board and a conductive member attached thereto.

Connection wires Ca, etc. shown in FIG. 3 can be connected to the connection terminals 3. The connection terminals 3 have a structure for direct engagement with core wires Cas, etc. of the inserted connection wires Ca, etc. Since a tip of, for example, a flat-tip screwdriver Dn is inserted into an operation opening 41, an engagement terminal disposed inside a connection hole 42 is opened. In this state, an end of the core wire Cas of the connection wire Ca from which a cover layer has been removed is inserted into the connection hole 42. Subsequently, the flat-tip screwdriver Dn is removed from the operation opening 41. As a result, the engagement terminal bites the core wire Cas in order to prevent coming off of the core wire Cas. Such connection of the connection wires Ca, etc. to the connection terminals 3 can be performed with ease and in a reliable manner. Notably, as shown in FIG. 3, core wires Cbs, Ccs, etc. of a plurality of connection wires Cb, Cc, etc. can be connected to a single connection terminal 3 simultaneously.

Moreover, as shown in FIG. 2, a plurality (11 in the present embodiment) of switch units 23 are mounted on the printed wiring board 21 along the main rows Xm to be located adjacent thereto. As shown in the partially-extracted enlarged view of FIG. 2, each of the switch units 23 includes eight open/close switches 11 arranged in the lateral direction. A dip switch or any other suitable switch is used as the open/close switch 11. Each of the open/close switches 11 can be turned on and off through displacement of a corresponding switch knob 11n shown in FIG. 3. As shown in FIG. 5, one contact 11a of each open/close switch 11 is connected to one of paired connection terminals 3, and the other contact 11b of the open/close switch 11 is connected to the other of the paired connection terminals 3. In the present embodiment, the respective contacts 11a and 11b are connected to the connection terminals 3 via a wiring pattern provided on the printed wiring board 21.

Figure 6:
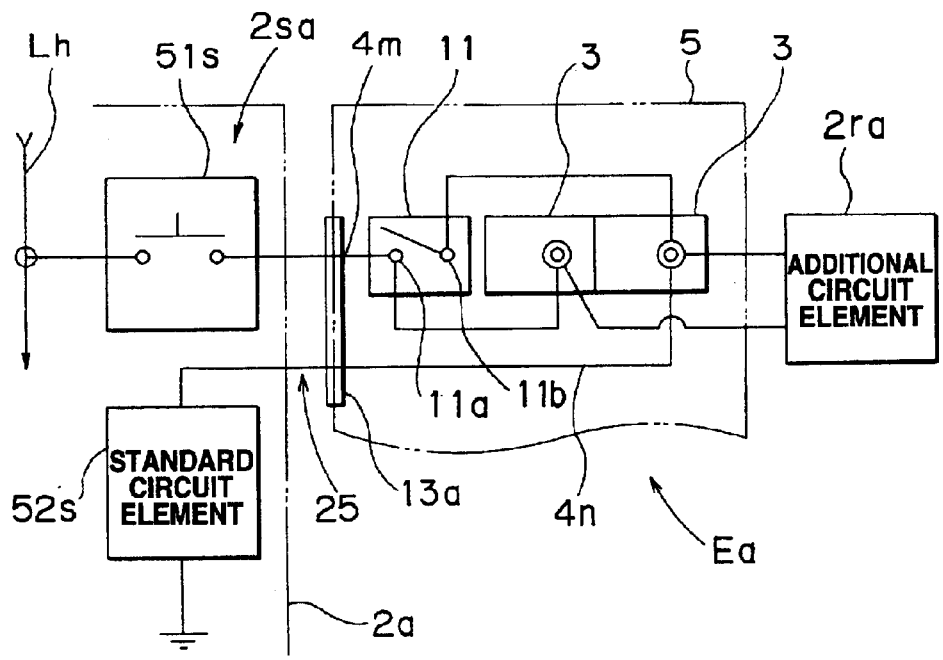
FIG. 6 is a circuit diagram showing a main circuit (a circuit for later addition) of the electric circuit apparatus which is configured as a modified standard circuit element.
Figure 7:
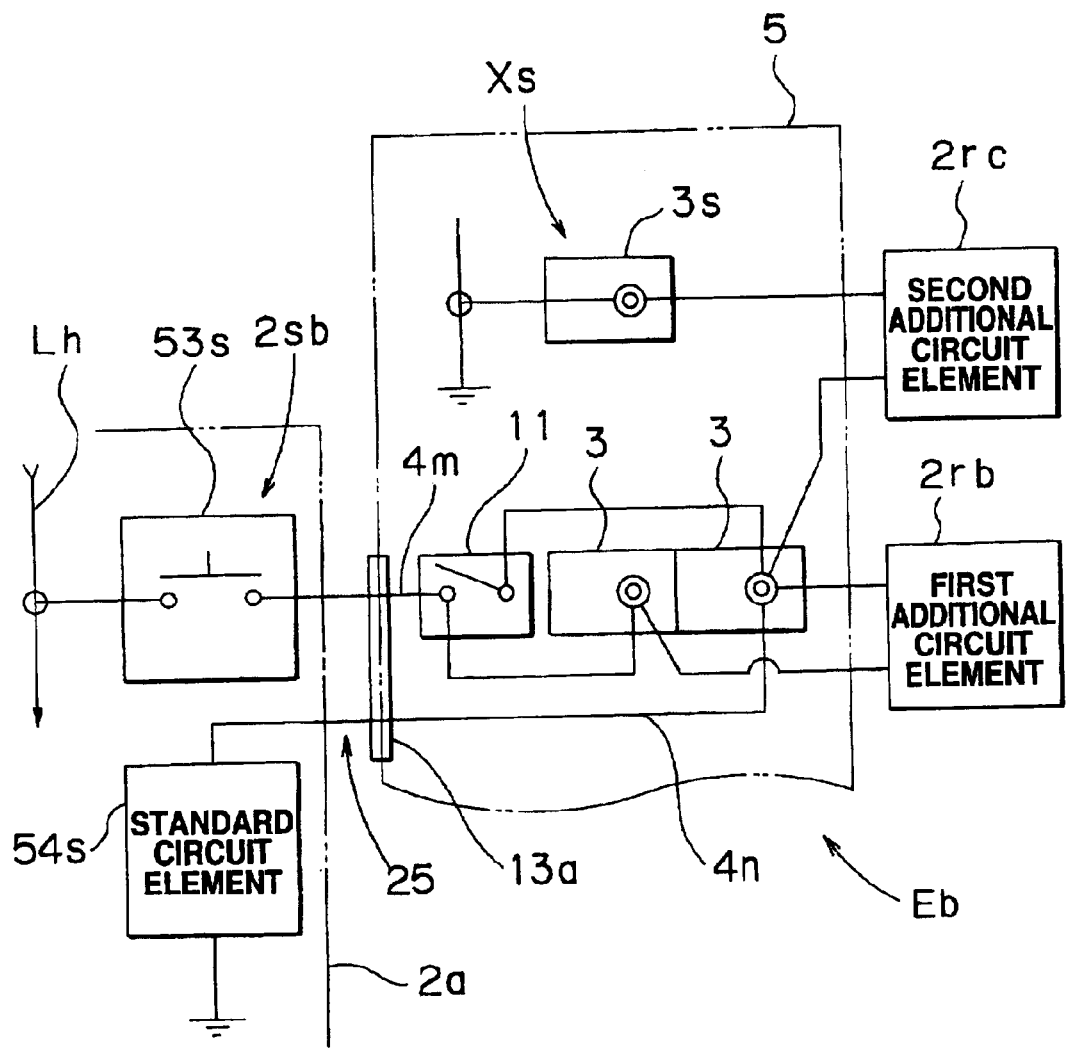
FIG. 7 is a circuit diagram showing a main circuit (a circuit for later addition) of the electric circuit apparatus which is configured as another modified standard circuit element.

Meanwhile, as shown in FIG. 1, a plurality (six in the present embodiment) of connectors 13a, etc. are provided on the printed wiring board 21 in order to establish connection with external circuit elements 2a, etc. In the present embodiment, the connector 13a is a 50-pin connector which is connected to the sequencer 2a via a connection cable 25; the connector 13b is a 40-pin connector which is connected to the sequencer 2a via a connection cable 26; the connector 13c is a 30-pin connector which is connected to the operation box 2b via a connection cable 27; the connector 13d is a 30-pin connector which is connected to the relay board 2c via a connection cable 28; the connector 13e is a 14-pin connector which is connected to the group of mold-clamp-unit proximity switches 2i via a connection cable 29; and the connector 13f is a 10-pin connector which is connected to the group of injection-unit proximity switches 2j via a connection cable 30. In the electric circuit apparatus 1 having the above-described configuration, a large number of circuits for later addition Ea, Eb, etc., as shown in FIGS. 5 to 7, can be provided by use of the connector board 5.

The circuit for later addition Ea shown in FIG. 5 includes a standard circuit element 2Sa provided within the sequencer 2a. The standard circuit element 2Sa is formed by a series circuit including a standard circuit element (switch) 51s and a standard circuit element 52s and connected between a power source line Lh and the ground line. The circuit for later addition Ea is configured (designed) to enable a user to modify the standard circuit element 2Sa. In this case, the connection line connecting the standard circuit elements 51s and 52s is divided into two line segments, which are respectively connected to the paired line segments 4m and 4n provided on the printed wiring board 21, via the connection cable 25 and the connector 13a.

Accordingly, when no additional circuit element is connected between the paired connection terminals 3 in the circuit for later addition Ea and the open/close switch 11 is turned on, the standard circuit element 2sa in which the standard circuit elements 51s and 52s are connected in series can be obtained. Meanwhile, when the open/close switch 11 is turned off through operation of the switch knob 11n and, as shown in FIG. 6, an additional circuit element 2ra is connected between the paired connection terminals 3 by use of the connection wires Ca, etc. (FIG. 3), a series circuit including the standard circuit element 51s, the additional circuit element 2ra, and the standard circuit element 52s can be obtained. Therefore, the user can modify the standard circuit element 2sa with ease.

Meanwhile, the circuit for later addition Eb shown in FIG. 7 includes a standard circuit element 2Sb provided within the sequencer 2a. The standard circuit element 2Sb is formed by a series circuit including a standard circuit element (switch) 53s and a standard circuit element 54s and connected between the power source line Lh and the ground line. The circuit for later addition Eb is configured (designed) to enable a user to modify the standard circuit element 2Sb in a manner different from that in the case of the above-described standard circuit element 2Sa. In this case, the connection line connecting the standard circuit elements 53s and 54s is divided into two line segments, which are respectively connected to the paired line segments 4m and 4n provided on the printed wiring board 21, via the connection cable 25 and the connector 13a.

Accordingly, when no additional circuit element is connected between the paired connection terminals 3 in the circuit for later addition Eb and the open/close switch 11 is turned on, there can be obtained the standard circuit element 2sb, which is similar to that shown in FIG. 5, and in which the standard circuit elements 53s and 54s are connected in series. Meanwhile, when the open/close switch 11 is turned off through operation of the switch knob 11n and, as shown in FIG. 7, a first additional circuit element 2rb is connected between the paired connection terminals 3, one of which is then connected to a connection terminal 3s in the auxiliary row Xs via a second additional circuit element 2rc, there can be formed a circuit which includes a series circuit including the standard circuit element 53s, the first additional circuit element 2rb, and the standard circuit element 54s and in which the second additional circuit element 2rc is connected between one end of the first additional circuit element 2rb and the ground line.

As described above, in the electric circuit apparatus 1 according to the present embodiment, the connector board 5 is provided; and the connector board 5 and other circuit elements 2a, etc. are connected by use of the connectors 13a, etc. Therefore, a large number of wiring lines, each being divided into paired line segments 4m and 4n for enabling connection of additional circuit elements 2ra, etc., can be provided in a concentrated manner in order to reduce the overall installation space. In addition, since the connection element 6, etc. for short-circuiting or the additional circuit element 2ra, etc. can be selectively connected between the paired connection terminals 3, connection work can be facilitated, and the required work time can be shortened. In addition, since the connection terminals 3 have a structure for enabling direct engagement of the core wires Cas, etc. of the inserted connection wires Ca, etc., additional connections which are formed on a user side can be improved in certainty and reliability.

In the above-descried embodiment, the open/close switch 11 is used as the connection element 6 for short-circuiting. However, in place of the open/close switch 11, a conductive member 12 shown in FIG. 4 may be used. The conductive member 12 has connection lead portions 12s at opposite ends. Through operation of inserting the connection lead portions 12s into the connection holes 42 of the paired connection terminals 3, the paired connection terminals 3 can be short-circuited to thereby established a state equivalent to the state in which the open/close switch 11 is in an on state. Meanwhile, when the connection lead portions 12s are removed from the paired connection terminals 3, there can be established a state equivalent to the state in which the open/close switch 11 is in an off state. The shape of the connection member 12 is not limited to that shown in FIG. 4 and may be a mere connection wire.

While the present invention has been described with reference to the preferred embodiment, the present invention is not limited thereto. Regarding structural details, shapes, components, quantities, among others, modifications and any omission or addition may be possible as needed without departing from the scope of the invention. Particularly, the circuits for later addition Ea and Eb shown in FIGS. 5 and 7 are mere examples, and any circuit having an equivalent function can be employed.

What is claimed is:

1. An electric circuit apparatus of an injection molding machine, the electric circuit apparatus consisting of a plurality of mutually connected circuit elements and including a connector board, said connector board comprising:
   a plurality of connection terminals to which connection wires can be connected; and
   a plurality of wiring lines each divided into two line segments in order to enable an additional circuit element to be connected to one of the plurality of mutually connected circuit elements,
   the line segments of each of the plurality of wiring lines being electrically connected to one pair of the plurality of connection terminals, wherein
   a connection element for short-circuiting the additional circuit element which is selectively connected to the one pair of the plurality of connection terminals.

2. The electric circuit apparatus of an injection molding machine according to claim 1, wherein each of said plurality of connection terminals has a structure for enabling direct engagement of a core wire of a connection wire inserted thereto.

3. The electric circuit apparatus of an injection molding machine according to claim 1, wherein the connection element is an open/close switch which is connected between the pair of connection terminals.

4. The electric circuit apparatus of an injection molding machine according to claim 1, wherein the connection element is a conductive member which is connectable between the pair of connection terminals.

5. The electric circuit apparatus of an injection molding machine according to claim 1, wherein the connector board includes a printed wiring board on which the line segments of the plurality of wiring lines are formed by means of a wiring pattern.

6. The electric circuit apparatus of an injection molding machine according to claim 5, wherein a plurality of connection units are mounted on the printed wiring board.

7. The electric circuit apparatus of an injection molding machine according to claim 6, wherein a plurality of pairs of the connection units are arranged along a basic row extending in a certain direction in such a manner that two connection units in each pair are arranged in a direction perpendicularly to the certain direction; and the remaining connection units are arranged, in a single line, along an auxiliary row extending in the certain direction.

8. The electric circuit apparatus of an injection molding machine according to claim 6, wherein each of the connection units in the basic row includes connection terminals arranged along the certain direction; and connection leads of the connection terminals and the line segments of the wiring lines are connected to each other in such a manner that a certain connection terminal of one connection unit in a pair has electrical continuity with one line segment of a corresponding wiring line, and a connection terminal of the other connection unit in the pair adjacent to the certain connection terminal has electrical continuity with the other line segment of the corresponding wiring line.

9. The electric circuit apparatus of an injection molding machine according to claim 7, wherein the connection terminals in the auxiliary row are all connected to a ground line.

10. The electric circuit apparatus of an injection molding machine according to claim 1, wherein one or more connectors for connecting external circuit elements to the wiring lines are mounted on the connector board.

* * * * *